United States Patent Office 3,478,042
Patented Nov. 11, 1969

3,478,042
PRODUCTION OF N:N-DISUBSTITUTED TETRA-HYDRO-4:4'-BIPYRIDYL WITH THE USE OF A WATER IMMISCIBLE SOLVENT IN A REDUCTION PROCESS
John Edward Colchester and John Hubert Entwisle, Runcorn, England, assignors to Imperial Chemical Industries Limited, Millbank, London, England, a corporation of Great Britain
No Drawing. Filed Apr. 11, 1966, Ser. No. 541,505
Int. Cl. C07d 31/40
U.S. Cl. 260—296                                         9 Claims

ABSTRACT OF THE DISCLOSURE

There is provided a process for the manufacture of a N:N'-disubstituted tetrahydro-4:4'-bipyridyl which comprises reducing the corresponding N-substituted pyridinium salt in an aqueous medium. The improvement resides in carrying out the reduction in the presence of an immiscible organic solvent for the tetrahydrobipyridyl product. With the use of such a solvent the product is removed from the reduction zone and increases the yield of the reduction. Examples of such solvents are diethyl ether, tetrahydrofuran and benzene.

---

This invention relates to a process for the manufacture of organic bases and more particularly for the manufacture of N:N'-disubstituted tetrahydro-4:4'-bipyridyls.

It is known that aqueous solutions of N-methylpyridinium salts and some analogous compounds can be reduced either electrolytically or with sodium amalgam to form the corresponding N:N'-disubstituted tetrahydro-4:4'-bipyridyls. The product of reduction may be either an oil or a solid. Particularly when the product is an oil, we find that reaction can be slow or incomplete, and that this effect is apparently due to the accumulation of the product in the zone of reduction. Also, this oily product tends to cling to metal (e.g. amalgam) surfaces, and accumulation of this can cause polarisation in the case of an electrolytic process and in the case of an amalgam reduction can promote the formation of emulsions of mercury in the reaction mixture. When the reduction product is a solid, losses of mercury tend to arise in the amalgam reductions due to entrainment in the product and these losses may be considerable.

We have now found that these difficulties can be overcome by carrying out the reduction in the presence of an organic solvent for the tetrahydro bipyridyl product, which dissolves it and removes it from the reduction zone.

Thus according to our invention we provide a process for the manufacture of an N:N'-disubstituted tetrahydro-4:4'-bipyridyl which comprises reducing the corresponding N-substituted pyridinium salt in aqueous medium in the presence of an immiscible liquid organic solvent for the tetrahydro-bipyridyl product.

The organic solvent for the purposes of our invention is preferably one which is immiscible with the aqueous medium and is not affected itself by the reductive process and may be in particular a hydrocarbon or an ether, for example benzene, toluene, xylene, trimethyl benzenes, hexane, iso-octane, n-decane, petroleum ether or other petroleum fractions, diethyl ether, di-n-propyl ether, tetrahydrofuran, dibutyl carbitol, or mixtures thereof. It is also possible to use other water-immiscible organic solvents, even if they have some possibility of reacting (for example by being reduced), provided that such side reaction does not either interfere with the course of the desired reduction of the pyridinium salt or produce by-products which interfere with the isolation or recovery of the desired tetrahydrobipyridyl product. Mixtures of solvents may also be used if desired. The main consideration for choice is usually the boiling point of the solvent, which should be convenient for the operations to be carried out. It is advantageous for the solvent to have a specific gravity less than 1, as this aids separation of the organic solvent phase (containing the product) from the aqueous phase after reaction.

The process of our invention is especially applicable to the case in which the product is an oil, as is the case when the starting material is an N-alkyl-pyridinium salt, for example N-methyl- and N-ethyl-pyridinium chlorides. The process is also applicable to the use, as starting material, of a benzyl pyridinium salt, or a pyridinium salt having as N-substituent a carbamido alkyl substituent, particularly one of the form —$R_1$—CO—$NR_2R_3$ wherein $R_1$ is a hydrocarbon radical (especially the methylene radical) and $R_2$ and $R_3$ are hydrocarbon or substituted hydrocarbon radicals, and wherein $R_2$ and $R_3$ may, together with the attached nitrogen atom, make up a heterocyclic ring. Examples of these starting materials include the products made by reaction of pyridine with N:N'-disubstituted chloracetamides, for example N:N'-diethyl chloracetamide, N - (chloroacetyl) - piperidine and N-(chloroacetyl)-3,5-dimethyl morpholine. The salt is conveniently a halide salt, though others may be used if desired.

The reduction may be carried out conveniently by means of an alkali metal amalgam, particularly sodium amalgam. For this purpose it is more convenient to use an amalgam which is liquid. The reaction may be carried out by agitating the mixture of aqueous pyridinium salt solution, amalgam, and the organic solvent until reaction has proceeded to the desired degree, after which the mixture can be allowed to settle, and the organic solvent phase containing the tetrahydrobipyridyl product can be separated. The mercury (i.e. spent amalgam) phase can also be recovered for re-use.

Alternatively the reduction can be carried out electrolytically. High yields and current efficiencies can be obtained by using neutral or alkaline aqueous solutions of the N-substituted pyridinium salt as electrolyte and maintaining the cathode potential within ±0.2 volt of the polarographic half-wave potential for the reduction of particular pyridinium salt used. In the case of the reduction of N-methyl-pyridinium salts it is preferred to maintain the cathode potential in the range −1.45 ±0.2 volt with reference to a saturated calomel electrode. Complete conversion of the pyridinium salt to the tetrahydro bipyridyl derivative can be achieved, without reduction in the current efficiency, if the current is reduced during the course of the electrolysis at a rate such as to maintain the potential in the desired range. The addition of a salt which has a high conductance in solution, for example sodium chloride, to the electrolyte improves the conductivity of the electrolyte and decreases the specific electrical energy consumption (kilowatt-hours per unit of tetrahydrobipyridyl produced) for the electrolysis.

The cathode material may be conveniently mercury, though other metals, preferably of high hydrogen over potential (for example copper or lead) may also be used.

The concentration of the pyridinium salt in the aqueous solutions used in these reduction procedures may be any convenient concentration up to saturation level, though we prefer not to use very dilute solutions. When additional salts are added to the solution, as for example to improve the conductivity for the electrolytic reduction, allowance should be made for the fact that high concentrations of pyridinium salt may reduce the solubility of the salts being added. Accordingly, the optimum concentrations of both pyridinium salt and additive salts are inter-related and we prefer that the concentration of salts other than the pyridinium salt are kept below about 5 molar concentration.

The reaction may be carried out at a variety of temperatures, though it is preferable to use a temperature at which the tetrahydrobipyridyl product (which may in some circumstances be an unstable compound) is not decomposed to any troublesome extent. In general, a temperature in the range approximately 20° to 30° C. is very convenient.

The products produced by the process of this invention are especially useful for conversion by oxidation into the corresponding N:N'-disubstituted 4:4'-bipyridynium salts, especially by treatment with a quinone and then with an acid, as in the process more fully described in our copending U.K. application No. 14,720/64.

The invention is illustrated but not limited by the following examples in which the parts and percentages are by weight unless otherwise stated.

EXAMPLE 1

A glass cell with a diaphragm, mercury cathode and platinum anode was set up. The anolyte was 120 ml. of a neutral 5 M aqueous solution of sodium chloride and the catholyte was 100 ml. of a 5 M aqueous solution of sodium chloride to which was added 20 g. of N-methyl pyridinium chloride. Electrolysis was carried out at approximately 20–25° C. under an atmosphere of nitrogen at a current of 0.4 amp and a cathodic current density of 0.44 amp./cm.$^2$. The product (N:N'-dimethyltetrahydrobipyridyl) was continuously removed from the cathode surface by addition of diethyl ether (50 ml.) to the catholyte, with gentle agitation to promote contact with the mercury surface. The cathode potential was observed during the electrolysis (with reference to a saturated calomel electrode) and slowly increased from −1.3 volts to −1.6 volts during the course of 90 minutes. At the end of this period the cathode potential increased sharply to −1.9 to −2.0 volts and sodium amalgam started to form, thus causing loss of current efficiency for tetrahydrobipyridyl formation. Electrolysis was then stopped. The yield of the N:N'-dimethyl tetrahydrobipyridyl was found to be 1.9 g., equivalent to a current efficiency of 90%. Conversion of methyl pyridinium chloride to tetrahydrobipyridyl was 10%. The catholyte could then be made up by addition of fresh quaternary salt until it again contained 20 g. methyl pyridinium chloride, and the electrolysis repeated. When electrolysis was carried out without the addition of ether for continuous extraction of the product as described above, the cathode immediately polarised and little conversion to dimethyl tetrahydrobipyridyl occurred.

EXAMPLE 2

A mixture of 100 ml. of a neutral aqueous solution containing 22.8 g. (0.175 mole) of N-methylpyridinium chloride, 715 g. of sodium amalgam containing 4 g. (0.174 mole) of sodium, and 200 ml. of diethyl ether was stirred vigorously for 10 minutes under an inert atmosphere. When reaction had ceased, the ether layer was separated, dried and filtered—these operations being carried out under an inert atmosphere. The ether was removed by vacuum distillation, thus yelding 16.2 g. (0.086 mole) of N:N'-dimethyltetrahydro-4:4'-bipyridyl, which was found by analysis and molecular weight determination to be substantially pure.

What we claim is:

1. In a process for the manufacture of an N:N'-disubstituted tetrahydro-4:4'-bipyridyl which comprises reducing the corresponding N-substituted pyridinium salt consisting of N-lower alkyl pyridinium halides in an aqueous medium, the improvement which comprises carrying out the reduction in the presence of an alkali metal amalgam immiscible organic solvent for the tetrahydrobipyridyl product, which solvent has a specific gravity less than 1.

2. Process as claimed in claim 1 wherein the reduction is carried out by means of an alkali metal amalgam.

3. Process as claimed in claim 1 wherein the N-substituted pyridinium salt is an N-alkyl pyridinium salt selected from N-methyl and N-ethyl pyridinium chlorides.

4. Process as claimed in claim 1 wherein the reduction is carried out electrolytically.

5. Process as claimed in claim 4 wherein the cathode potential is either ±0.2 volt of the polarographic half-wave potential for the reduction of the pyridinium salt, and the catholyte is a neutral or alkaline aqueous solution of the pyridinium salt.

6. Process as claimed in claim 4 wherein the cathode material is mercury.

7. Process as claimed in claim 1 wherein the temperature employed is in the range of 20° C. to 30° C.

8. In a process for the manufacture of N:N'-disubstituted tetrahydro-4:4'-bipyridyl which comprises reducing the corresponding N-lower alkyl pyridinium halide salt in an aqueous medium the improvement comprising carrying out the reduction in the presence of an immiscible organic solvent for the tetrahydrobipyridyl and which has a specific gravity less than 1, wherein the reduction is carried out in an alkali metal amalgam or electrolytically in a neutral or basic aqueous solution, and wherein the said salt is selected from the group consisting of N-methyl and N-ethyl-pyridinium chlorides.

9. The process of claim 1 wherein the solvent is selected from the group consisting of benzene, toluene, xylene, trimethyl benzene, hexane, iso-octane, n-decane, petroleum ether, diethyl ether, di-n-propyl ether, tetrahydrofuran, dibutyl carbitol and mixtures thereof.

References Cited

UNITED STATES PATENTS 3,336,325   8/1967   Downes et al. _____ 260—294.9

HENRY R. JILES, Primary Examiner

ALAN L. ROTMAN, Assistant Examiner

U.S. Cl. X.R.

71—94; 260—247.7, 294.7, 295